United States Patent Office 3,644,426
Patented Feb. 22, 1972

3,644,426
PREPARATION OF DELTA VALERO-LACTONES
Robert A. Dombro, Chicago, Ill., assignor to Universal Oil Products Company, Des Plaines, Ill.
No Drawing. Continuation-in-part of application Ser. No. 578,505, Sept. 12, 1966. This application Aug. 15, 1969, Ser. No. 850,668
Int. Cl. C07d 7/06
U.S. Cl. 260—343.5                    10 Claims

ABSTRACT OF THE DISCLOSURE

Lactones may be prepared by treating mercaptans or disulfides with an oxidizing agent such as dimethyl sulfoxide in the presence of a polar solvent such as an alcohol, in an alkaline solution, such as sodium hydroxide at an elevated temperature. Thus, n-propyl mercaptan can be converted to alpha, gamma-dimethyl delta-valerolactone.

---

This application is a continuation-in-part of my copending application, Ser. No. 578,505, filed Sept. 12, 1966, now abandoned.

This invention relates to a process for the preparation of a lactone and more particularly, to a process for converting a mercaptan or a symmetrically substituted disulfide under conditions hereinafter set forth in greater detail to form disubstituted lactones.

The compounds which are prepared according to the process of the present invention comprise lactones and preferably alkyl-substituted lactones. These compounds may be utilized in many ways in the chemical industry. For example, the lactone, per se, may be utilized as a solvent for various plastic compounds. They also are used as fragrances and in cosmetic preparations. In addition, the lactone may be utilized as a starting material or monomer for the preparation of polyester resins. A primary example of this is the condensation of glycerin plus an alkyl-substituted lactone to give a specific type of polyester resin. It is contemplated that other polyols such as glycols and other triols may also be utilized as a starting material to be condensed with the lactones to form the desired resin.

Heretofore, the prior art has shown that mercaptans can be oxidized to disulfides in the presence of an alkali and oxygen at relatively low temperatures, that mercaptans can be oxidized by hydrogen peroxide in a basic aqueous medium at ambient temperatures or that mercaptide ions and disulfides can be oxidized to sulfonic acids at room temperature.

In contradistinction to these prior art teachings, I have now discovered that substituted mercaptans or symmetrically disubstituted disulfides can be treated with an oxidizing agent in the presence of a polar solvent in an alkaline solution at relatively elevated temperatures to form disubstituted lactones, said lactones being utilized as intermediates in a manner hereinbefore set forth.

It is therefore an object of this invention to provide a process for preparing a lactone.

A further object of this invention is to prepare a lactone utilizing a primary mercaptan or a disubstituted disulfide as the starting material which is treated in a manner hereinafter set forth in greater detail.

In one aspect an embodiment of this invention resides in a process for the preparation of an alpha, gamma-dihydrocarbyl substituted delta valerolactone which comprises treating a substituted mercaptan or a symmetrically disubstituted disulfide having the formula:

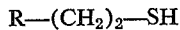
or
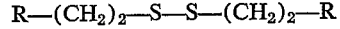

in which R is selected from the group consisting of alkyl of from 1 to about 18 carbon atoms, alkenyl, cycloalkyl of from 3 to 8 carbon atoms, phenyl, lower alkyl phenyl, and phenyl substituted lower alkyl radicals, with an oxidizing agent in the presence of a polar solvent in an alkaline solution at a temperature in the range of from about 100° to about 200° C., the hydrocarbyl substituents of said delta valerolactone each being R.

A specific embodiment of this invention is found in a process which comprises treating n-propyl mercaptan with dimethyl sulfoxide in the presence of methyl alcohol in an alkaline medium at a temperature in the range of from about 100° to about 200° C. and recovering the resultant alpha, gamma-dimethyl-delta-valerolactone.

Other objects and embodiments will be found in the following further detailed description of the present invention.

As hereinbefore set forth the present invention is concerned with a process for preparing lactones and specifically delta lactones which contain at least 1 carbon atom more than twice the number of carbon atoms in the mercaptan or at least one more carbon atom than in the disubstituted disulfide which constitute the starting material. Desired compounds are prepared by treating a substituted mercaptan containing at least 3 carbon atoms or a symmetrically disubstituted disulfide containing at least 6 carbon atoms with an oxidizing agent in an alkaline medium in the presence of a polar solvent to prepare the desired delta lactones. The substituted mercaptans or symmetrically substituted disulfides will possess the generic formula:

or
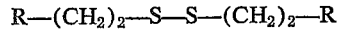

in which R is selected from the group consisting of alkyl of from 1 to about 18 carbon atoms, alkenyl, cycloalkyl of from 3 to 8 carbon atoms, phenyl lower alkyl phenyl, and phenyl substituted lower alkyl radicals. Furthermore, if the mercaptan or disulfide is a lower alkyl, phenyl or a phenyl substituted lower alkyl, it must possess at least 2 methylenes between the mercapto or disulfide linkage and the radicals. Specific examples of these substituted mercaptans or substituted disulfides which may be used include n-propyl mercaptan, n-butyl mercaptan, n-amyl mercaptan, 2-cyclopropylethyl mercaptan, 2-cyclohexylethyl mercaptan, 3-cycloheptylpropyl mercaptan, 2-phenylethyl mercaptan, 2-p-tolylethyl mercaptan, 3-butenyl mercaptan, di-n-propyl disulfide, di-n-butyl disulfide, di-n-amyl disulfide, di-2-cyclohexylethyl disulfide, di-3-cycloheptylpropyl disulfide, di-2-phenylethyl disulfide, di-2-p-tolylethyl disulfide, di-3-butenyl disulfide, the corresponding undecyl, dodecyl, eicosyl, etc., mercaptans and disulfides. It is to be understood that the aforementioned mercaptans and symmetrically substituted disulfides are only representative of the class of compounds which may be used, and that the present invention is not necessarily limited thereto.

The mercaptan or symmetrically substituted disulfide is treated with an oxidizing agent in the presence of a polar solvent in an alkaline solution. Examples of oxidizing agents which may be utilized in the process of this invention comprise those which may be generically termed as oxygen-containing compounds such as oxygen, air, hydrogen peroxide, calcium hypochlorite, magnesium hypochlorite, dimethyl sulfoxide, diethyl sulfoxide, dipropyl sulfoxide, etc., the preferred oxidizing agents comprising the lower alkyl sulfoxides such as dimethyl sulfoxide. Polar solvents which may be used comprise, in the preferred process of this invention, water, alcohols such as methyl alcohol, ethyl alcohol, propyl alcohol, isopropyl alcohol, etc., or mixtures thereof, the preferred solvent comprising methyl alcohol or aqueous methyl alcohol. It is contemplated that other solvents may be used such as ethanolamine, etc. although not necessarily with equivalent results.

The reaction is effected at elevated temperatures ranging from about 100° to about 200° C. and at pressures ranging from atmospheric up to 100 atmospheres or more, the pressure being that which is sufficient to maintain a major portion of the reactants in the liquid phase. The pressure which is required will usually be effected by introducing an inert gas such as nitrogen into the reaction mixture. In addition, the reaction is effected in an alcoholic alkaline medium, an aqueous alkali medium, or an aqueous alcoholic alkaline medium, the alkalinity being provided for by the use of alkali metal hydroxides such as potassium hydroxide, sodium hydroxide, lithium hydroxide, etc. It is contemplated that any other alkali metal or alkaline earth metal hydroxides or compounds which will provide an alkaline medium may also be utilized, although not necessarily with equivalent results.

The process of the present invention may be effected in any suitable manner and may comprise either a batch or a continuous type operation. For example, when a batch type operation is used, a quantity of the mercaptan or the symmetrically substituted disulfide is charged to an appropriate apparatus such as, for example, a rotating autoclave. In addition, the autoclave will also contain the alkaline material, the polar solvent, and the oxidizing agent such as a lower alkyl sulfoxide. The apparatus is then sealed and heated to the desired operating temperature hereinbefore set forth. In the event that the reaction is effected at operating pressures above atmospheric, an inert gas such as nitrogen is then charged to the reactor to provide and maintain the desired superatmospheric pressures. Upon completion of the desired residence time, the autoclave and contents thereof are allowed to cool to room temperature, the excess pressure, if any, is discharged, and the reaction mixture is recovered. This mixture is then subjected to conventional means of separation whereby the disubstituted lactone is recovered from any unreacted starting materials, solvent, alkali, and oxidizing agent.

It is also contemplated within the scope of this invention that the process described herein may be effected in a continual manner of operation. When such a type of operation is used, a quantity of the substituted mercaptan or substituted disulfide is continuously charged to a reaction vessel which is maintained at the proper operating conditions of temperature and pressure. In addition, the oxidizing agent and the polar solvent containing the alkali are also continuously charged to the vessel through separate lines, or if so desired, they may be utilized prior to entry into said reaction vessel and charged thereto in a single stream. Upon completion of the desired residence time, the reaction mixture is continuously withdrawn and subjected to a separation step wherein the desired lactone is separated from any unreacted mercaptan or disulfide, oxidizing agent, polar solvent and alkali, the latter three being recycled to form a portion of the feed stock, while the former is subjected to purification steps and charged to storage.

As hereinbefore set forth the present invention results in the formation of disubstituted lactones which contain at least 1 carbon atom more than twice the number of carbon atoms present in the substituent present in the mercaptan or at least one more carbon atom than in the symmetrically substituted disulfide. Examples of lactones which may be prepared according to the process of this invention include alpha, gamma-dimethyl-delta-valerolactone;
alpha, beta-dimethyl-delta-valerolactone;
alpha, gamma-diethyl-delta-valerolactone;
alpha, beta-diethyl-delta-valerolactone;
alpha, gamma-dipropyl-delta-valerolactone;
alpha, beta-dipropyl-delta-valerolactone;
alpha, gamma-dibutyl-delta-valerolactone;
alpha, beta-dibutyl-delta-valerolactone;
alpha, gamma-dicyclopropyl-delta-valerolactone;
alpha, gamma-dicyclohexyl-delta-valerolactone;
alpha, beta-dicyclohexyl-delta-valerolactone;
alpha, gamma-dicycloheptylmethyl-delta-valerolactone;
alpha, beta-dicycloheptylmethyl-delta-valerolactone;
alpha, gamma-diphenyl-delta-valerolactone;
alpha, beta-diphenyl-delta-valerolactone;
alpha, gamma-di-p-tolyl-delta-valerolactone;
alpha, beta-di-p-tolyl-delta-valerolactone;
alpha, gamma-divinyl-delta-valerolactone;
alpha, beta-divinyl-delta-valerolactone;
alpha, gamma-dipropenyl-delta-valerolactone;
alpha, beta-dipropenyl-delta-valerolactone;
alpha, gamma-diisopropenyl-delta-valerolactone;
alpha, beta-diisopropenyl-delta valerolactone; etc.

It is to be understood that the aforementioned lactones are only representative of the class of compounds which may be prepared and that the process of this invention is not necessarily limited thereto.

The following examples are given to illustrate the process of the present invention which, however, are not intended to limit the generally broad scope of the present invention in strict accordance therewith.

EXAMPLE I

In this example a solution of 0.5 mole of n-amyl mercaptan, 0.5 mole of dimethyl sulfoxide, 1.5 mole of potassium hydroxide along with 50 cc. of water and 150 cc. of methyl alcohol was placed in a reaction apparatus. The apparatus was then heated under 30 atmospheres nitrogen to a temperature ranging from 100° to 200° C. for a period of 4 hours. At the end of this time, the apparatus and contents thereof were cooled to room temperature and the reaction mixture after acidification was subjected to fractional distillation under reduced pressure. The desired product comprising alpha, gamma-dipropyl-delta-valerolactone which had a boiling point of 278–281° C., an index of refraction of 1.4570 at 20° C., saponification number 4.97 meq./gm., C. 71.5%; H, 10.3%; O, 18.2%, was recovered.

EXAMPLE II

In this experiment a mixture of 0.5 mole of di-n-octyl disulfide, 0.5 mole dimethyl sulfoxide in a methyl alcohol-potassium hydroxide solution was placed in a glass lined rotating autoclave. The autoclave was sealed and nitrogen pressed in until an initial pressure of 30 atmospheres was reached. The autoclave was then heated to a temperature in the range of from 100° to about 200° C. and maintained thereat for a period of about 4 hours. At the end of this time, the autoclave and contents thereof are allowed to cool to room temperature, the excess pressure was vented and the reaction mixture recovered. After separation by distillation under reduced pressure, the desired product comprising the alpha, gamma-dihexyl-delta-valerolactone was recovered. This product had a boiling point at 162° C at 1 mm. pressure, an index of refraction of 1.4622 at 22° C. The molecular weight of this compound was found to be 268. That calculated for the proposed compound is 270. In addition, the compound was subjected to analysis with the following results:

Calculated for.—$C_7H_{34}O_2$ (percent): C, 75.5; H, 12.7; O, 11.8. Found (percent): C, 76.9; H, 12.2; O, 11.6.

In addition, ultraviolet, infrared, and nuclear magnetic resonance spectra confirmed that the material was a dialkyl-substituted lactone.

EXAMPLE III

A mixture consisting of 4 moles of sodium hydroxide, 2 moles of dimethyl sulfoxide, 2 moles of n-propyl mercaptan, 150 g. of water and 300 cc. of methyl alcohol was heated in an autoclave at a temperature from about 100° to about 200° C. under 30 atmospheres of nitrogen pressure for a period of about 4 hours. At the end of this time, the autoclave and contents thereof were cooled to room temperature, the excess pressure was vented and the autoclave opened. After separation of the desired product from the unreacted starting materials, the resulting oil was subjected to analysis. The product, comprising alpha, gamma-dimethyl-delta-valerolactone had a boiling point of 229° C., an index of refraction of 1.4570 at 21° C. and a saponification number of 6.49 meq./g. Analysis of the product gave the following results:

Calculated for.—$C_7H_{12}O_2$ (percent): C, 65.59; H, 9.43; O, 24.96. Found (percent): C, 65.88; H, 9.34; O, 22.33.

In addition, the mass spectrum indicated a molecular weight of 128.

EXAMPLE IV

A mixture consisting of 4 moles of sodium hydroxide, 2 moles of dimethyl sulfoxide, 2 moles of n-butyl mercaptan, 150 g. of water and 300 cc. of methyl alcohol was treated in a manner similar to that set forth in Example III above. The desired product which was recovered from the reaction mixture comprised alpha, gamma - diethyl - delta - valerolactone which, upon analysis, had the following physical properties: A boiling point of 250° C., an index of refraction of 1.4577 at 21° C., a saponification number of 6.076 meq./g. and carbon - hydrogen - oxygen analysis of 69.5%, 10.1% and 20.27% respectively. Calculated for $C_9H_{16}O_2$ (percent): C, 69.19; H, 10.32; Q, 20.48. The nuclear magnetic resonance and infrared spectra showed a structure corresponding to a dialkyl substituted valerolactone.

EXAMPLE V

A mixture comprising 4 moles of sodium hydroxide, 2 moles of dimethyl sulfoxide and 2 moles of 2-phenylethyl mercaptan along with 150 g. of water and 300 cc. of methyl alcohol is placed in a glass lined rotating autoclave. The autoclave is sealed and nitrogen pressed in until an initial pressure of 30 atmospheres is reached. The autoclave is then heated to a temperature in the range of from 100° to 200° C. and maintained thereat for a period of about 4 hours. At the end of this time, the autoclave and contents thereof are allowed to cool to room temperature, the excess pressure is vented and the reaction mixture is recovered. The desired product comprising alpha, gamma - diphenyl - delta - valerolactone is recovered and separated by fractional distillation under reduced pressure.

EXAMPLE VI

In this example a mixture of 4 moles of sodium hydroxide, 2 moles of dimethyl sulfoxide, 2 moles of 2-cyclohexylethyl mercaptan, 150 g. of water and 300 cc. of methyl alcohol is treated in a manner similar to that set forth in the above examples. The desired product which comprises alpha, gamma - dicyclohexyl - delta-valerolactone is recovered from the reaction mixture by distillation under reduced pressure.

EXAMPLE VII

A mixture of sodium hydroxide, dimethyl sulfoxide, di-3-butenyl disulfide, water and methyl alcohol is subjected to treatment similar to that hereinbefore set forth. After recovery of the reaction mixture from the autoclave, the desired product comprising alpha, gamma-divinyl-delta-valerolactone is separated by fractional distillation under reduced pressure.

EXAMPLE VIII

In this example a mixture of sodium hydroxide, dimethyl sulfoxide, di-p-tolylethyl disulfide, water and methyl alcohol is placed in an autoclave and reacted under conditions similar to that set forth in the above examples. Upon completion of the desired residence time, the reaction mixture is recovered and the desired product comprising alpha, gamma-di-p-tolyl-delta-valerolactone is separated and recovered.

I claim as my invention:

1. A process for the preparation of an alpha, gamma-dihydrocarbyl substituted delta valerolactone which comprises treating a substituted mercaptan or a symmetrically di-substituted disulfide having the formula:

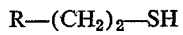

or

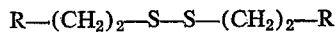

in which R is selected from the group consisting of alkyl of from 1 to about 18 carbon atoms, alkenyl of from 2 to 4 carbon atoms, cycloalkyl of from 3 to 8 carbon atoms, phenyl, lower alkyl phenyl and phenyl substituted lower alkyl radicals, with a lower dialkyl sulfoxide in the presence of a polar solvent in an alkaline solution at a temperature in the range of from about 100° to about 200° C., the hydrocarbyl substituents of said delta valerolactone each being R.

2. The process as set forth in claim 1 in which said lower dialkyl sulfoxide is dimethyl sulfoxide.

3. The process as set forth in claim 1 in which said lower dialkyl sulfoxide is dibutyl sulfoxide.

4. The process as set forth in claim 1 in which said polar solvent is methyl alcohol.

5. The process as set forth in claim 1 in which said substituted mercaptan is n-propyl mercaptan and said lactone is alpha, gamma-dimethyl-delta-valerolactone.

6. The process as set forth in claim 1 in which said substituted marcaptan is 2-phenylethyl mercaptan and said lactone is alpha, gamma-diphenyl-delta-valerolactone.

7. The process as set forth in claim 1 in which said substituted mercaptan is 2-cyclohexylethyl mercaptan and said lactone is alpha, gamma-dicyclohexyl-delta-valerolactone.

8. The process as set forth in claim 1 in which said substituted mercaptan is n-butyl mercaptan and said lactone is alpha, gamma-diethyl-delta-valerolactone.

9. The process as set forth in claim 1 in which said substituted mercaptan is di-3-butenyl disulfide and said lactone is alpha, gamma-divinyl-delta-valerolactone.

10. The process as set forth in claim 1 in which said substituted mercaptan is di-p-tolylethyl disulfide and said lactone is alpha, gamma-di-p-tolyl-delta-valerolactone.

References Cited

UNITED STATES PATENTS 3,493,586   2/1970   Kuhn et al. _____ 260—343.5

ALEX MAZEL, Primary Examiner

A. M. T. TIGHE, Assistant Examiner